US009625593B2

(12) United States Patent
Neelamani et al.

(10) Patent No.: US 9,625,593 B2
(45) Date of Patent: Apr. 18, 2017

(54) SEISMIC DATA PROCESSING

(75) Inventors: Ramesh Neelamani, Houston, TX (US); Partha S. Routh, Katy, TX (US); Jerome R. Krebs, Houston, TX (US); Anatoly Baumstein, Houston, TX (US); Thomas A. Dickens, Houston, TX (US); Warren S. Ross, Houston, TX (US); Gopalkrishna Palacharla, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1187 days.

(21) Appl. No.: 13/614,932

(22) Filed: Sep. 13, 2012

(65) Prior Publication Data

US 2013/0003500 A1    Jan. 3, 2013

Related U.S. Application Data

(63) Continuation-in-part of application No. 13/430,380, filed on Mar. 26, 2012, now abandoned.
(Continued)

(51) Int. Cl.
*G01V 1/28* (2006.01)

(52) U.S. Cl.
CPC ............ *G01V 1/28* (2013.01); *G01V 2210/32* (2013.01); *G01V 2210/40* (2013.01); *G01V 2210/51* (2013.01)

(58) Field of Classification Search
CPC .. G01V 1/28; G01V 2210/51; G01V 2210/32; G01V 2210/40
(Continued)

(56) References Cited

U.S. PATENT DOCUMENTS

| 4,851,779 A | 7/1989 | DeMeester et al. |
| 5,099,208 A | 3/1992 | Fitzpatrick et al. |

(Continued)

FOREIGN PATENT DOCUMENTS

| WO | WO 2008/095289 | 8/2008 |
| WO | WO 2011/041782 | 4/2011 |

OTHER PUBLICATIONS

Baysal, E. et al. (1983), "Reverse time migration," *Geophysics* 48(11), pp. 1514-1524.
(Continued)

*Primary Examiner* — Luke Ratcliffe
*Assistant Examiner* — Amienatta M N'Dure
(74) *Attorney, Agent, or Firm* — ExxonMobil Upstream Research-Law Department

(57) ABSTRACT

The invention includes a method for reducing noise in migration of seismic data, particularly advantageous for imaging by simultaneous encoded source reverse-time migration (SS-RTM). One example embodiment includes the steps of obtaining a plurality of initial subsurface images; decomposing each of the initial subsurface images into components; identifying a set of components comprising one of (i) components having at least one substantially similar characteristic across the plurality of initial subsurface images, and (ii) components having substantially dissimilar characteristics across the plurality of initial subsurface images; and generating an enhanced subsurface image using the identified set of components. For SS-RTM, each of the initial subsurface images is generated by migrating several sources simultaneously using a unique random set of encoding functions. Another embodiment of the invention uses SS-RTM for velocity model building.

17 Claims, 7 Drawing Sheets

Related U.S. Application Data

(60) Provisional application No. 61/479,199, filed on Apr. 26, 2011.

(58) Field of Classification Search
USPC .................................................. 367/73, 47
See application file for complete search history.

(56) References Cited

U.S. PATENT DOCUMENTS

| | | | |
|---|---|---|---|
| 5,274,605 A | 12/1993 | Hill | |
| 5,349,527 A | 9/1994 | Pieprzak et al. | |
| 5,677,893 A | 10/1997 | de Hoop et al. | |
| 5,852,588 A | 12/1998 | de Hoop et al. | |
| 5,999,488 A | 12/1999 | Smith | |
| 6,021,094 A * | 2/2000 | Ober | G01V 1/28 367/50 |
| 6,055,482 A | 4/2000 | Sudhakar et al. | |
| 6,466,873 B2 | 10/2002 | Ren et al. | |
| 6,545,944 B2 | 4/2003 | de Kok | |
| 6,584,409 B2 | 6/2003 | Wisecup | |
| 6,687,618 B2 | 2/2004 | Bevc et al. | |
| 6,687,659 B1 | 2/2004 | Shen | |
| 6,778,909 B1 | 8/2004 | Popovici et al. | |
| 6,819,628 B2 | 11/2004 | Tal-Ezer | |
| 6,826,484 B2 | 11/2004 | Martinez et al. | |
| 6,856,911 B2 | 2/2005 | Wang et al. | |
| 6,920,084 B2 | 7/2005 | MacKay | |
| 6,996,470 B2 | 2/2006 | Kamps | |
| 7,072,767 B2 | 7/2006 | Routh et al. | |
| 7,167,414 B2 | 1/2007 | Lee et al. | |
| 7,355,923 B2 | 4/2008 | Reshef et al. | |
| 7,373,252 B2 | 5/2008 | Sherrill et al. | |
| 7,388,808 B2 | 6/2008 | Lee et al. | |
| 7,391,674 B2 | 6/2008 | Welker | |
| 7,400,553 B1 | 7/2008 | Jin et al. | |
| 7,447,113 B2 | 11/2008 | Martinez et al. | |
| 7,584,056 B2 | 9/2009 | Koren | |
| 7,599,798 B2 | 10/2009 | Beasley et al. | |
| 7,660,199 B2 | 2/2010 | Drew | |
| 7,675,815 B2 | 3/2010 | Saenger et al. | |
| 7,859,942 B2 | 12/2010 | Stork | |
| 8,537,638 B2 * | 9/2013 | Lee | G01V 1/368 367/73 |
| 8,879,355 B2 * | 11/2014 | Soubaras | G01V 1/282 367/38 |
| 2003/0074812 A1 * | 4/2003 | Stump | E02F 5/06 37/348 |
| 2005/0285787 A1 * | 12/2005 | Delaveau | G01S 13/003 342/387 |
| 2007/0272473 A1 | 11/2007 | Herkenhoff et al. | |
| 2008/0137480 A1 | 6/2008 | MacNeill | |
| 2009/0010104 A1 | 1/2009 | Leaney | |
| 2009/0043545 A1 | 2/2009 | van Manen et al. | |
| 2009/0052280 A1 | 2/2009 | Herrmann et al. | |
| 2010/0018718 A1 * | 1/2010 | Krebs | G01V 1/28 166/369 |
| 2010/0039894 A1 * | 2/2010 | Abma | G01V 1/362 367/52 |
| 2010/0097888 A1 * | 4/2010 | Neelamani | G01V 1/005 367/53 |
| 2010/0114494 A1 | 5/2010 | Higginbotham et al. | |
| 2010/0141508 A1 * | 6/2010 | Nguyen | G01S 13/90 342/25 F |
| 2010/0183198 A1 * | 7/2010 | Marmal Yevskyy | G01V 1/28 382/109 |
| 2010/0220895 A1 | 9/2010 | Koren et al. | |
| 2011/0069582 A1 | 3/2011 | Nichols et al. | |
| 2011/0077516 A1 | 3/2011 | Abe | |
| 2011/0194379 A1 * | 8/2011 | Lee | G01V 1/368 367/73 |

OTHER PUBLICATIONS

Claerbout, J.F. (1971), "Toward a Unified Theory of Reflector Mapping," *Geophysics* 36(3), pp. 467-481.

Dai, W. et al. (2009), "Least-squares Migration of Simultaneous Sources Data with a Deblurring Filter," *SEG Expanded Abstract*, pp. 2990-2994.

Goodwin, J. et al. (2010), "Simultaneous source imaging by amplitude encoding," CWP-645, pp. 21-41.

Luo, Y. et al. (2009), "Seismic modeling and imaging based upon spectral-element and adjoint methods," *The Leading Edge*, pp. 568-574.

Perrone, F. et al. (2009), "Comparison of shot encoding functions for reverse-time migration," *SEG Expanded Abstract*, pp. 2980-2984.

Perrone, F. et al. (2010), "Wave-equation migration with dithered plane waves," SWP-646, pp. 43-64.

Romero, L.A. et al. (2000), "Phase encoding of shot records in prestack migration," *Geophysics* 65(2), pp. 426-436.

Stolt, R.H. (1978), "Migration by Fourier Transform," *Geophysics* 43(1), pp. 23-48.

Tang, Y. et al. (2009), "Least-squares migration/inversion of blended data," *SEG Expanded Abstract*, pp. 1041-1044.

Temme, P. (1984), "A comparison of common-midpoint, single-shot, and plane-wave depth migration," *Geophysics* 49(11), pp. 1896-1907.

Verschuur, D.J. et al. (2009), "Target oriented least-squares imaging of blended data," *SEG Expanded Abstract*, pp. 2889-2893.

Ward, R.M. et al. (1990), "Phase Encoding of Vibroseis Signals for Simultaneous Multisource Acquisition," *SEG Technical Program Abstracts* 9(1), pp. 938-941.

Whitmore, N.D. (2009), "Iterative depth migration by backward time migration," *SEG Expanded Abstract*, pp. 382-385.

Whitmore, N.D. et al. (1993), "Interval velocity estimation using iterative prestack depth migration in the constant angle domain," *The Leading Edge*, pp. 757-762.

Whitmore, N.D. (1996), "An Imaging Hierarchy for Common-Angle Plane Wave Seismograms," Dissertation, The University of Tulsa, The Graduate School, pp. 1-37.

Whitmore, N.D. (1996), "An Imaging Hierarchy for Common-Angle Plane Wave Seismograms," Dissertation, The University of Tulsa, The Graduate School, pp. 37-87.

Whitmore, N.D. (1996), "An Imaging Hierarchy for Common-Angle Plane Wave Seismograms," Dissertation, The University of Tulsa, The Graduate School, pp. 87-118.

\* cited by examiner

SEISMIC DATA PROCESSING

CROSS-REFERENCE TO RELATED APPLICATION

This application is a continuation-in-part of U.S. application Ser. No. 13/430,380, filed Mar. 26, 2012, now abandoned entitled SEISMIC DATA PROCESSING and claims the benefit of U.S. Provisional Patent Application 61/479,199, filed Apr. 26, 2011, entitled SEISMIC DATA PROCESSING, the entirety of which is incorporated by reference herein.

FIELD OF THE INVENTION

The invention relates generally to the field of geophysical prospecting, and more particularly to seismic data processing. Specifically, the invention is a method for identifying and/or reducing signal noise introduced by various conventional inversion techniques.

BACKGROUND OF THE INVENTION

Geophysical inversion attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories:
 a. Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.
 b. Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute.

In general, inversion is beneficial in correcting observed seismic data so that reflections are plotted at a true representation of their subsurface locations (Stolt, 1978; Claerbout, 1985). The need to correct (i.e., invert) observed seismic data arises, for example, because reflections from dipping interfaces are observed, and therefore recorded, at surface positions that are not directly above the subsurface locations where the reflections actually occur. Also, isolated point-like discontinuities in the subsurface (i.e., point scatterers) generate seismic events (e.g., diffractions) recorded over a large range of receivers. Such diffractions can make the proper interpretation of seismic data confusing. Furthermore, seismic velocity variations can also cause a distorted view of the subsurface geology (Yilmaz, 1987). It is only after inversion that the structures and geometric configurations observed in seismic recordings can be thought of as an accurate depiction of the geologic layers that gave rise to the seismic reflections.

Because of the increased complexity of iterative inversion, it is generally desirable to use a non-iterative form of inversion (i.e., imaging, migration, etc.) when possible. However, as industry explores more complex geographic areas, traditional imaging and interpretation methods fail to provide subsurface images having the quality (e.g., accuracy) desired in making decisions on exploration and production. For example, wave-equation migration algorithms are based upon the one-way wave-equation approach. The one-way wave equation assumes that waves propagate in only one primary direction, either down into the subsurface or up from the subsurface. Because of the one-directional nature of propagation, imaging steeply dipping reflectors is difficult.

Advanced imaging tools that use full physics of wave-propagation, such as reverse time migration (i.e., RTM), generally provide better images of the subsurface. Such approaches use solutions of the two-way wave equation. Migration techniques that use the two-way wave equation generally provide a more accurate result because waves propagating in all directions are handled equally well, and wave amplitudes are properly modeled since no approximations are used in the algorithm. However, there is a cost associated with conventional two-way wave equation techniques. Specifically, the full physics of propagating waves in a complex geological setting where the medium velocity is complicated is very computationally intensive. The computational demand is further accentuated when there are many (e.g., thousands) shot records to be migrated in a three-dimensional (3D) setting and/or when high frequency data is obtained in an effort to increase the resolution of the subsurface images. It is desirable, therefore, to have a system and/or method for increasing the computational efficiency (i.e., reducing the computational cost) of two-way wave equations based techniques, such as RTM.

SUMMARY OF THE INVENTION

The present disclosure relates generally to the field of geophysical prospecting, and more particularly to seismic data processing. One exemplary embodiment includes the steps of obtaining a plurality of initial subsurface images; decomposing each of the initial subsurface images into components; identifying a set of components comprising one of (i) components having at least one substantially similar characteristic across the plurality of initial subsurface images, and (ii) components having substantially dissimilar characteristics across the plurality of initial subsurface images; and generating an enhanced subsurface image using the identified set of components. Each of the initial subsurface images is generated using a unique random set of encoding functions.

Another exemplary embodiment includes the steps of obtaining a plurality of simultaneous-source reverse-time migration (SS-RTM) subsurface images; decomposing each of the plurality of SS-RTM subsurface images into curvelet coefficients; averaging the curvelet coefficients to generate a preliminary signal curvelet coefficient estimate; computing a variance of a subset of the curvelet coefficients to determine a noise level in the preliminary signal curvelet coefficient estimate; attenuating noise in the curvelet coefficients using the determined noise level and the preliminary signal curvelet coefficient estimate to generate attenuated curvelet coefficients; and performing an inverse curvelet transform on the attenuated curvelet coefficients to generate an enhanced SS-RTM image. Each of the SS-RTM subsurface images is generated using a unique random unit-magnitude set of encoding functions.

Yet another exemplary embodiment includes computing a gradient of a cost function associated with seismic data by generating a plurality of gradients of objective functions computed using unique sets of random reciprocal encoding functions; decomposing each of the gradients into components; identifying a set of components having at least one substantially similar characteristic across the plurality of gradients; and generating an enhanced gradient using the identified set of components.

Another example embodiment includes using SS-RTM for velocity model building. An advantage of using SS-RTM is that it speeds up the velocity model building process. In a typical migration algorithm, the forward and the backward wave field are cross-correlated to form an image. If the velocity model is accurate, then the cross-correlation at zero-lag cross-correlation will focus the energy constructively to form the image. If the velocity is incorrect then the focusing is poor. In traditional practice, image gathers are generated and flatness of these gathers is examined as a metric to qualify the accuracy of the velocity model. However, the process of generating image gathers from wave-based migration (such as RTM) is an expensive process particularly when individual shots are used in the analysis. Typically in a 3D survey one has several thousands of shots. This embodiment of the present inventive method offers a cheaper alternative that can aid in judging the quality of the velocity model.

BRIEF DESCRIPTION OF THE DRAWINGS

The present invention will hereinafter be described in conjunction with the following figures, wherein like numerals denote like elements.

Due to patent law restrictions on use of color, FIGS. 4A-4B are black and white reproductions of color drawings.

DETAILED DESCRIPTION

Definitions

Figure 1:
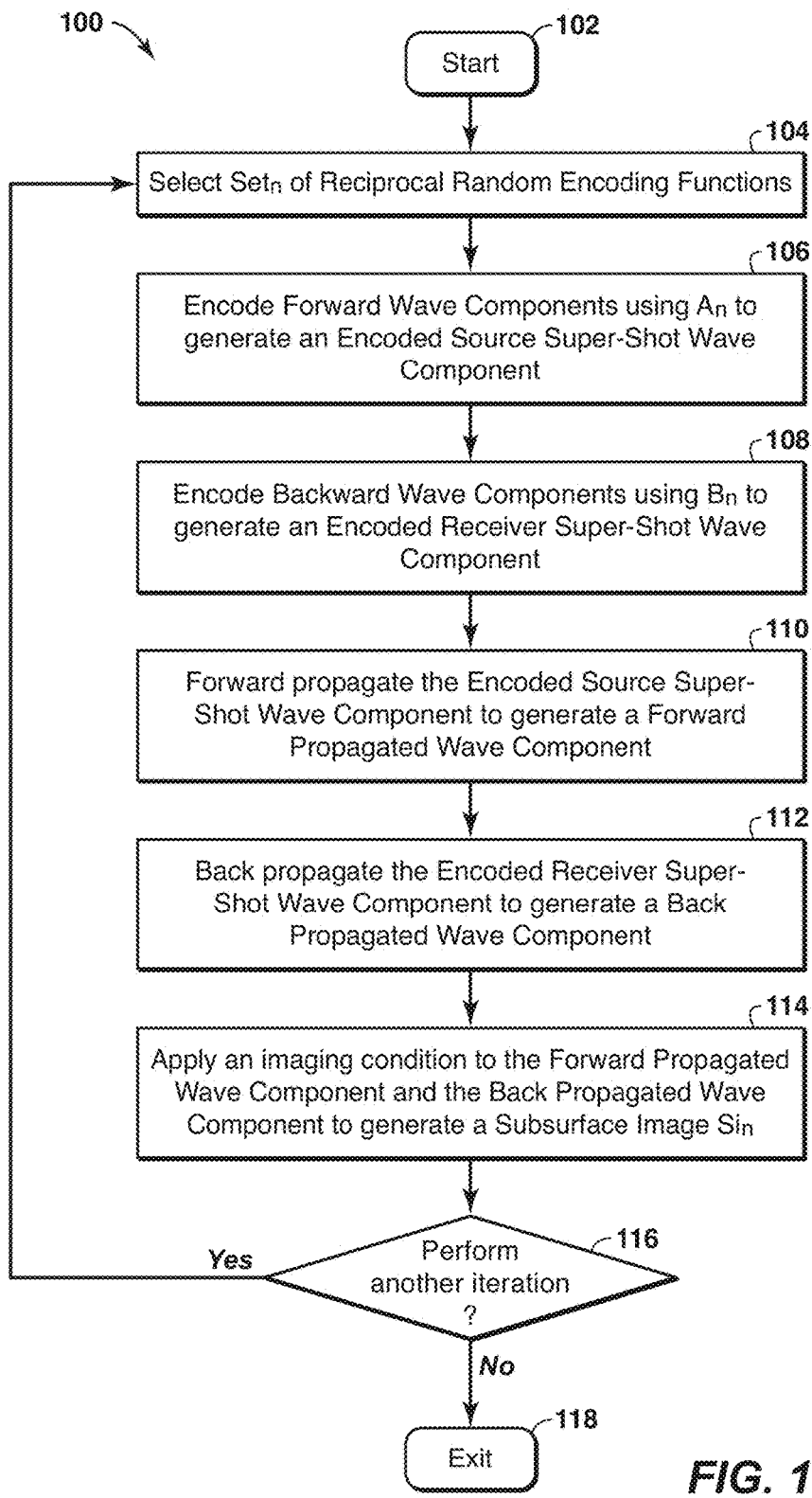
FIG. 1 is a flow diagram of a method for iteratively performing SS-RTM in accordance with an embodiment of the present invention.

Various terms as used herein are defined below. To the extent a term used in a claim is not defined below, it should be given the definition persons in the pertinent art have given that term.

As used herein, the "a" or "an" entity refers to one or more of that entity. As such, the terms "a" (or "an"), "one or more", and "at least one" can be used interchangeably herein unless a limit is specifically stated.

As used herein, the terms "comprising," "comprises," "comprised," and "comprise" are open-ended transition terms used to transition from a subject recited before the term to one or more elements recited after the term, where the element or elements listed after the transition term are not necessarily the only elements that make up of the subject.

As used herein, the terms "containing," "contains," and "contain" have the same open-ended meaning as "comprising," "comprises," and "comprise."

As used herein, the term "exemplary" means "serving as an example, instance, or illustration." Any embodiment described herein as "exemplary" is not necessarily to be construed as preferred or advantageous over other embodiments.

As used herein, the terms "having," "has," and "have" have the same open-ended meaning as "comprising," "comprises," and "comprise."

As used herein, the terms "including," "includes," and "include" have the same open-ended meaning as "comprising," "comprises," and "comprise."

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Description

For illustrative purposes, the present invention is described below in connection with reverse time migration and, more specifically, simultaneous source reverse time migration (i.e., SS-RTM). However, it will be apparent to one skilled in the art having the benefit of this disclosure that the present technique may be used in connection with any two-way wave inversion technique.

The significant computational cost of RTM imaging is driven by the wavefield extrapolation procedure. This procedure comprises accurate forward propagation of the source wavefield as well as backward propagation of the recorded receiver wavefield. These propagated wavefields are then combined by an imaging condition (e.g., cross-correlation) to produce a corresponding subsurface image (Whitmore, 1983; Baysal et al., 1983). In traditional depth-imaging of seismic data, individual shot gathers (i.e., source and receiver wavefield pairs corresponding to source and receiver hardware pairs) are imaged separately; that is, for each shot, the source and receiver wavefields are extrapolated and then combined to produce the subsurface image. The complete RTM image is constructed by combining the subsurface images generated from each shot. For such an approach, the cost of imaging is directly proportional the number of shots. Thus the cost of RTM increases significantly as the number of shots increases.

Simultaneous source migration (Romero et al., 2000) is one technique that may be used to reduce the computational cost of RTM. In simultaneous source imaging, several shots are encoded using a random encoding function to form a super-shot, and this super-shot is then migrated. The computational cost of migrating a super-shot is similar to the cost of migrating a single shot. Thus the use of simultaneous source migration may significantly reduce the cost of RTM. Unfortunately, the use of simultaneous source migration generally introduces undesirable noise into the resulting subsurface image. Most notably, the image suffers from interference between the different sources. Consequently, the resulting SS-RTM image suffers from low signal to noise ratio. The present inventive method introduces a denoising strategy to address this problem.

The basic mathematical framework of simultaneous source migration can be described as explained below. Let S(i) denote each source wavefield, of which there is generally many, and R(i,j) denote the receiver wavefield activated by a given S(i). The interference arises because the cross-correlation between the forward propagated S(i) and back-propagated R(k,j), for k≠i, is not zero. More specifically:

$$\text{Effective SuperShot} = \Sigma_i\, a(i)S(i) \qquad [\text{EQ 1}]$$

$$\text{Effective SuperShot receiver measurement at } j\text{-th receiver} = \Sigma_i\, a(i)R(i,j) \qquad [\text{EQ2}]$$

In conventional SS-RTM, the Effective SuperShot source would be forward propagated, and the effective SuperShot receiver measurement would be back-propagated. The results of the forward and back propagation would then be crosscorrelated (denoted by $\otimes$). Let F denote forward propagation and B denote back propagation operators.

$$\text{Image} = F\left[\sum_i a(i)S(i)\right] \otimes B\left[\sum_k a(k)R(k,j)\right] \qquad [\text{EQ3}]$$

$$= \left(\sum_i |a(i)|^2 F[S(i)] \otimes B[R(i,j)]\right) +$$

$$\left(\sum_{i,k} a(i)a*(k)F[S(i)] \otimes B[R(k,j)]\right)$$

where * denotes complex conjugation.
Note that:

$$\text{Signal (1st term in Image)} = F[S(i)] \otimes B[R(i,j)] \text{ and} \qquad [\text{EQ4}]$$

$$\text{Interference Noise (2nd term in Image)} = F[S(i)]$$
$$\otimes B[R(k,j)], \text{ with } k \neq i \qquad [\text{EQ5}]$$

It may be beneficial, therefore, to distinguish between, and then subsequently separate, the signal and noise components from the SS-RTM image. It may be noted that instead of measured receiver wavefields and source wavefields; one can use preconditioned/pre-processed receiver and source wavefields to construct the SS-RTM image.

One conventional technique that attempts to reduce the noise component is to use random source encoding (Romero et al., 2000; Perrone and Sava, 2009, 2010). Typically several runs with different encodings are carried out and the images from those runs are then stacked; see Ober et al, U.S. Pat. No. 6,021,094, and Romero et al, 2000. Such a method may produce an image with less artifacts. However, such an approach relies solely on averaging to perform noise attenuation and does not fully leverage the diversity of information in the available encoded SS-RTM images.

Another conventional technique that may reduce cross-talk artifacts is to formulate the Simultaneous Source imaging problem as a least-squares migration problem (Verschuur and Berkhout, 2009; Tang and Biondi, 2009; Dai and Schuster, 2009). Perrone and Sava (2009; 2010) investigated different encoding schemes as well as mixed encoding schemes such as a combination of linear and random encoding to reduce cross-talk artifacts. Godwin and Sava (2010) use singular value decomposition to determine an encoding scheme that attempts to balance computational cost savings with the number of cross-talk artifacts. The Godwin-Sava method inherently assumes that the images generated using each encoding is stacked. As such the Godwin-Sava method does not permit the estimation of the signal components that are not imaged in the final result without conducting additional SS-RTM runs and stacking the resulting images.

It may be appreciated from the above discussion, then, that a need exists for a better system and/or method for reducing noise component (i.e., cross-talk artifacts). The present invention provides such a system and/or method. In contrast to conventional techniques which generally use the same encoding for each source and receiver pair (see EQ1 and EQ2), the present invention may, in at least one embodiment, optionally use a first set of encodings for the sources and a second set of encodings for the receivers. That is:

$$\text{Effective SuperShot} = \Sigma_i\, a(i)S(i), \text{ and} \qquad [\text{EQ6}]$$

$$\text{Effective SuperShot receiver measurement at } j\text{-th receiver} = \Sigma_i\, b(i)R(i,j) \qquad [\text{EQ7}]$$

Consequently, the effective SS-RTM image may be given by:

$$\text{Image} = F\left[\sum_i a(i)S(i)\right] \otimes B\left[\sum_k b(k)R(k,j)\right] \qquad [\text{EQ8}]$$

$$= \left(\sum_i a(i)b*(i)F[S(i)] \otimes B[R(i,j)]\right) +$$

$$\left(\sum_{i,k} a(i)b*(k)F[S(i)] \otimes B[R(k,j)]\right)$$

In at least one other embodiment, however, the present invention may use the same and/or equivalent encoding for each source and receiver pair.

In general, the present invention comprises the following steps to improve signal and interference noise separation in SS-RTM images. First, SS-RTM is performed a plurality of times to generate a plurality of subsurface images. Different "reciprocal" sets of source and receiver random encoding functions are used during each application of SS-RTM to the set of shot gathers. It may be understood that a pair of random encoding functions, such as $a_n(i)$ and $b_n(i)$, are "reciprocal" when $a_n(i)=1/b_n*(i)$ or $a_n(i)=b_n(i)=0$, where n denotes the SS-RTM run index. Second, the resulting signal and noise characteristics are used along with the plurality of resulting SS-RTM images to generate an enhanced image with reduced interference noise. With regard to the second step, and as previously discussed, one conventional strategy to obtain an enhanced image is to average (i.e., stack) a plurality of generated subsurface images; see Ober et al, U.S. Pat. No. 6,021,094, and Romero et al, 2000. During stacking, the signal component adds constructively (i.e., stacks in) and the noise component gets attenuated (i.e., stacks out). The stacked image can be mathematically expressed as $$\text{Stack} = \frac{\sum_{n=1}^{N} \text{Image}_n}{N} = \text{Signal} + \frac{\sum_{n=1}^{N} \text{Noise}_n}{N} \qquad [\text{EQ9}]$$

The signal-to-noise-ratio (i.e., SNR) of the signal and noise events may be predicted as a function of the number of runs. The noise energy would be controlled by the average of a string of random phase (such as ±1) numbers. It is possible to show that the all interference noise terms would cancel out after stacking only when $N_s$ SS-RTM runs are conducted, with $N_s$ denoting the number of shots, and the encodings chosen to be orthogonal to each other. Note that if $N_s$ SS-RTM runs are conducted, then no efficiency is gained. When substantially fewer than $N_s$ SS-RTM runs (i.e., $N \ll N_s$) are conducted, then simple stacking of the SS-RTM images does not adequately attenuate the interference noise. It is desirable, therefore, to have a system and/or method for generating an enhanced image that does not exhibit the deficiencies of the stacking method.

With reference now to FIG. 1, a flow diagram of a method 100 for iteratively performing SS-RTM is provided in accordance with at least one embodiment of the present invention. The method 100 may be advantageously implemented in connection with any appropriate method and/or system, such as a computer implemented system, to meet the design criteria of a particular application. The method 100 generally includes a plurality of blocks or steps that may be performed serially. As will be appreciated by one of ordinary skill in the art, the order of the steps shown in FIG. 1 is exemplary and the order of one or more steps may be modified within the spirit and scope of the present invention. Additionally, the steps of the method 100 may be performed in at least one non-serial (or non-sequential) order, and one or more steps may be omitted to meet the design criteria of a particular application. Block 102 represents an entry point into the method 100.

At block 104, a $Set_n$ of Random Encoding Functions is selected. The $Set_n$ comprises Random Encoding Functions $A_n$ and $B_n$, where $B_n$ is generally reciprocal to $A_n$. It may be noted, however, that in at least one embodiment $A_n$ may be identical to or equivalent to $B_n$.

At block 106, the Forward (i.e., source) Wave Components of a set of shot gathers are encoded using the Random Encoding Function $A_n$ to generate an Encoded Source Super-Shot Wave Component.

At block 108, the Backward (i.e., received) Wave Components of the set of shot gathers are encoded using Random Encoding Function $B_n$ to generate an Encoded Receiver Super-Shot Wave Component.

At block 110, the Encoded Source Super-Shot Wave Component is forward propagated to generate a Forward Propagated Wave Component.

At block 112, the Encoded Receiver Super-Shot Wave Component is back propagated to generate a Back Propagated Wave Component.

At block 114, an imaging condition is applied to the Forward Propagated Wave Component and the Back Propagated Wave Component to generate a Subsurface Image ($SI_n$).

The steps represented by blocks 104-114 may be performed for any appropriate number of iterations to satisfy the design criteria of a particular application. Decision block 116 represents the determination of whether or not additional iterations are desirable. If additional iterations are desirable, then the method 100 generally returns to block/step 104. Each $Set_n$ selected at block 104 is unique in that each set includes at least one member that makes the set, as a whole, different from any previously selected set. For example, a $Set_n$ may include Reciprocal Random Encoding Functions X and Y and $Set_2$ may include Reciprocal Random Encoding Functions X and Z. $Set_1$ and $Set_2$ are unique because the set XY is not identical to the set XZ. It may be appreciated that subscript n represents an indexing digit that is generally modified upon each iteration.

If the method 100 does not return to block 104 then the method 100 generally falls through to block 118. Block 118 represents an exit from the method 100.

As illustrated in FIG. 1, then, SS-RTM is generally performed repeatedly (i.e., more than once) on a given seismic data set (e.g., shot gather set) using reciprocal sets of source and receiver random encoding functions $a_n(i)$'s and $b_n(i)$'s respectively. For such reciprocal encodings, the n-th SS-RTM image would be described by:

$$\text{Image}_n = F\left[\sum_i a_n(i)S(i)\right] \otimes B\left[\sum_k b_n(k)R(k, j)\right] \quad [EQ10]$$

$$= \left(\sum_i a_n(i)b_n*(i)F[S(i)] \otimes B[R(i, j)]\right) +$$

$$\left(\sum_{i,k} a_n(i)b_n*(k)F[S(i)] \otimes B[R(k, j)]\right)$$

$$= \left(\sum_i F[S(i)] \otimes B[R(i, j)]\right) +$$

$$\left(\sum_{i,k} a_n(i)b_n*(k)F[S(i)] \otimes B[R(k, j)]\right),$$

$$= \text{Signal} + \text{Noise}_n$$

The use of reciprocal encodings insures that each SS-RTM image is comprised of both the desired signal (with unit magnitudes in each Image) and a noise that varies across the different SS-RTM images.

In at least one embodiment, unit-magnitude complex numbers may be used as $a_n(i)$'s. In such an embodiment $a_n(i)=b_n(i)$, $|a_n(i)|=|b_n(i)|=1$, and the n-th SS-RTM image would be described by:

$$\text{Image}_n = F\left[\sum_i a_n(i)S(i)\right] \otimes B\left[\sum_k a_n(k)R(k, j)\right] \quad [EQ11]$$

$$= \left(\sum_i |a_n(i)|^2 F[S(i)] \otimes B[R(i, j)]\right) +$$

$$\left(\sum_{i,k} a_n(i)a_n*(k)F[S(i)] \otimes B[R(k, j)]\right),$$

$$= \left(\sum_i f[S(i)] \otimes B[R(i, j)]\right) +$$

$$\left(\sum_{i,k} \exp(j\theta_n(i, k))F[S(i)] \otimes B[R(k, j)]\right),$$

$$= \text{Signal} + \text{Noise}_n$$

where $\theta_n(i,k)$ is the phase difference between $a_n(i)$ and $a_n*(k)$. Once again, the use of unit-magnitude encodings generally provides a signal component that does not vary and a noise component that varies in phase across different SS-RTM images. As the number of RTM runs (i.e., iterations) increases, the probability that an interference induced noise event does not change phase drops exponentially.

Figure 2:
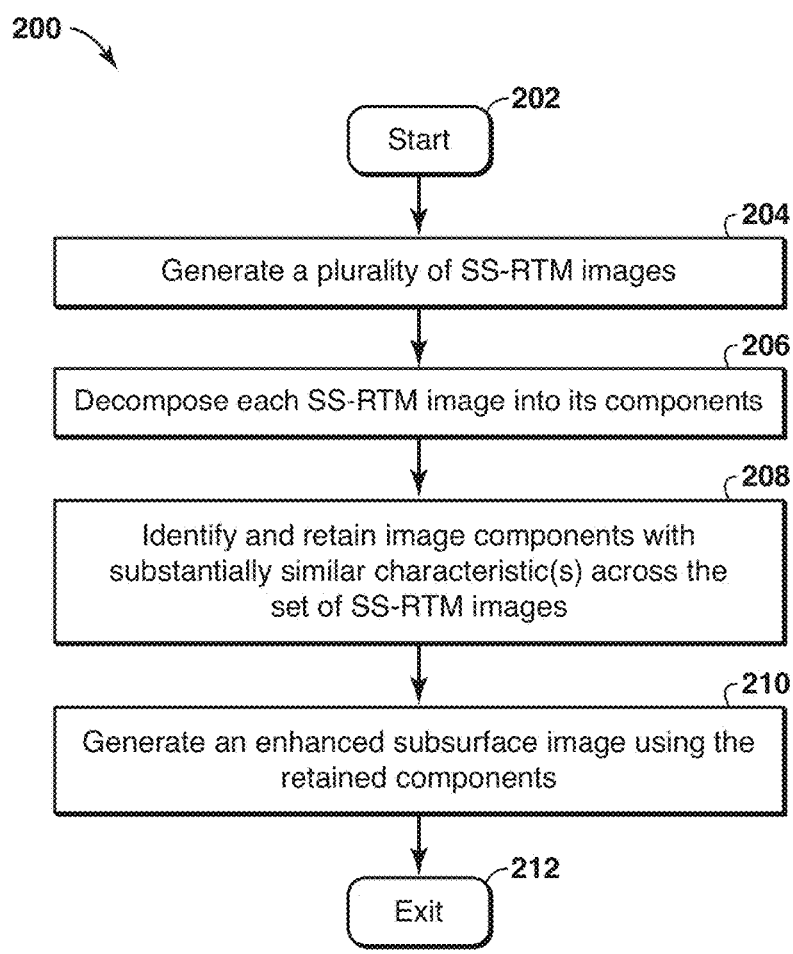
FIG. 2 is a flow diagram of a method for generating an enhanced image in accordance with an embodiment of the present invention.

With reference now to FIG. 2, a flow diagram of a method 200 for generating an enhanced image is provided in accordance with at least one embodiment of the present invention. The method 200 may be advantageously implemented in connection with any appropriate method, such as the method 100, and/or system, such as a computer implemented system, to meet the design criteria of a particular application.

The method 200 generally includes a plurality of blocks or steps that may be performed serially. As will be appreciated by one of ordinary skill in the art, the order of the steps shown in FIG. 2 is exemplary and the order of one or more steps may be modified within the spirit and scope of the present invention. Additionally, the steps of the method 200 may be performed in at least one non-serial (or non-sequential) order, and one or more steps may be omitted to meet the design criteria of a particular application. Block 202 represents an entry point into the method 200.

At block 204 a plurality of SS-RTM images are generated using different (i.e., unique) random reciprocal sets of encoding functions. In at least one embodiment the SS-RTM images are generated using the method 100 of FIG. 1, above. However, any appropriate method and/or system may be used to generate the images to satisfy the design criteria of a particular application.

At block 206 each SS-RTM image is decomposed into its components. In at least one embodiment, the decomposition is performed by transforming the image into a different domain (e.g., frequency). In one embodiment a linear transform such as the Fourier transform, wavelet transform, curvelet transform, F-K transform, radon transform, and/or the like may be used to decompose the image into transform domain coefficients (fourier/wavelet/curvelet, F-K, radon coefficients). However, any appropriate technique may be used to satisfy the design criteria of a particular application.

At block 208, image components with substantially similar characteristic(s), such as phase and/or magnitude coefficients, across the set of SS-RTM images are identified. Substantially constant components are generally associated with signal energy and, therefore, are retained. Alternatively, if the characteristic(s) of an image component varies across the set of SS-RTM images, then such a component predominantly contains noise energy and, therefore, may preferably be attenuated.

At block 210 an enhanced subsurface image may be generated by combining the retained components. In general, the enhanced image will exhibit less noise than an image resulting directly from SS-RTM.

Block 212 represents an exit from the method 200.

In summary, each original SS-RTM image may include constant signal terms as well as variable noise terms. If, for example, a reflection event in an SS-RTM image maintains a substantially constant amplitude across SS-RTM images (i.e., runs), then that reflection event is likely to be a part of the desired signal. In contrast, if a reflection event varies across SS-RTM runs, then that reflection event is a component of interference noise and should be attenuated.

In at least one specific embodiment, the method 200 of FIG. 2 may include the following steps:
1. A plurality of SS-RTM images are generated using different known random reciprocal unit-magnitude encoding functions (e.g., step 204).
2. The curvelet transform of all the SS-RTM images are generated (e.g., step 206).
3. The set of curvelet coefficients from all the SS-RTM coefficients that contain a specific dip, frequency, and location are identified and combined to form an enhanced curvelet coefficient (e.g., step 208). More specifically:
   i. The set of curvelet coefficients are averaged to provide a preliminary signal curvelet coefficient estimate.
   ii. The noise level in the preliminary signal coefficient estimate is deduced by computing the variance of the set of curvelet coefficients
   iii. If the signal curvelet coefficient estimate's energy is substantially larger than the noise level, then the coefficient is retained almost unaltered (primarily signal). If the noise level is large, then the coefficient is attenuated (primarily noise). It may be noted that one skilled in the art having the benefit of this disclosure may select among any one or more of several techniques to perform the signal to noise comparison (e.g., hard-thresholding, soft-thresholding, empirical Bayes thresholding, Wiener filtering, or the like).
4. The inverse curvelet transform of the retained coefficients may then be generated to obtain the interference-free RTM image (e.g., step 210).

While the present invention has generally been described with encoding performed using scalars in the time domain, it should be understood that the invention may also be extended to include frequency-domain encodings. Different sets of reciprocal source and receiver random encoding functions, $a_n(i)[f]$'s and $b_n(i)[f]$'s respectively, may be used for each frequency f of the source function and receiver measurement, such that $a_n(i)[f]=1/b_n*(i)[f]$ or $a_n(i)[f]=b_n(i)[f]=0$. Crosscorrelation in the time domain is equivalent to multiplication with complex conjugation in the frequency domain. Therefore, by using different reciprocal encodings in the frequency domain, the SS-RTM image resulting from frequency component f is given by:

$$\text{Image}_n[f] = F\left[\sum_i a_n(i)[f]S(i)[f]\right]B\left[\sum b_n*(k)[f]R*(k,j)[f]\right] \quad [EQ12]$$

$$= \left(\sum_i a_n(i)[f]b_n*(i)[f]F[S(i)[f]]B[R(i,j)*[f]]\right) +$$

$$\left(\sum_{i,k} a_n(i)[f]b_n*(k)[f]F[S(i)[f]]B[R*(k,j)[f]]\right).$$

$$= \left(\sum_i F[S(i)[f]]B[R(i,j)*[f]]\right) +$$

$$\left(\sum_{i,k} a_n(i)[f]b_n*(k)[f]F[S(i)[f]]B[R*(k,j)[f]]\right).$$

$$= \text{Signal}[f] + \text{Noise}_n[f]$$

The total image may be generated by summing over all frequency contributions. Again, as described earlier, unlike the signal component, the noise does generally vary across SS-RTM runs.

A known special case of SS-RTM employs so-called plane waves. In such a case, the source functions and receiver measurements are delayed so that the effective source functions and receiver measurements resemble planar waves. Plane-wave decomposed source functions and receiver measurements may then be used as effective sources and receivers and a plane-wave SS-RTM image may be constructed using, for example, equation [EQ12]. Note that time-domain delays is equivalent to linear phase encodings in the frequency domain.

In at least one embodiment, then, step 204 of method 200 may be implemented using different reciprocal random encoding functions on plane waves with different angle of incidence. Such an approach is mathematically equivalent to constructing the frequency domain encodings (i.e., $a_n(i)[f]$) by randomly combining linear phase encodings. In such a case, $b_n(i)[f]=1/a_n(i)[f]$.

With reference now to FIGS. 3A-3D, images from a specific example are shown to further illustrate the application of one or more embodiments of the present invention. It should be understood that these images and the corresponding discussion that follows are provided for clarity and are not intended to limit the present invention in any manner beyond the limits setout in the attached claims. The individual shots were simulated with marine streamer geometry.

Figure 3A:
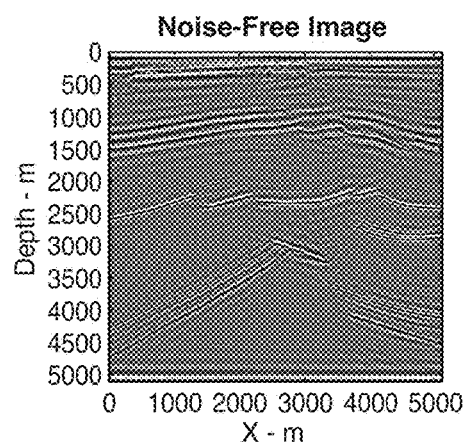
FIGS. 3A-3D are images corresponding to an exemplary simulated application of one or more embodiments of the present invention.

FIG. 3A shows a simulated stacked RTM image obtained by migrating 383 individual shots along the 2D line. As such, this image represents the results of conventional SS-RTM migration and may be used as a benchmark to exemplify the quality of the present invention. It may be noted that these individual shots were encoded using time-domain binary (±1) encoding scheme.

Figure 3B:
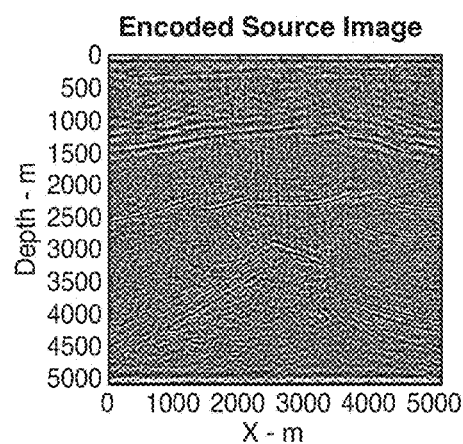
Figure 3C:
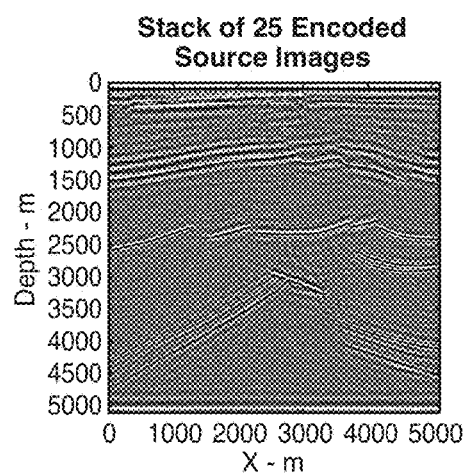
Figure 3D:
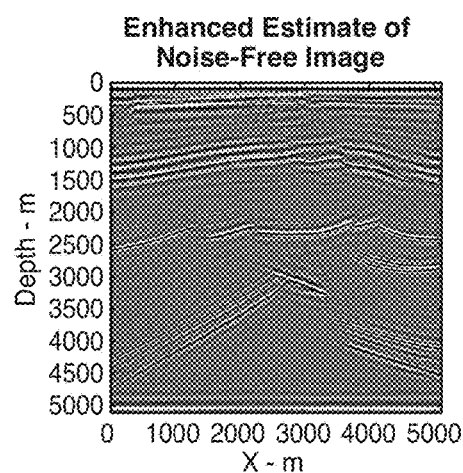

FIG. 3B shows an image obtained by simulating RTM on one encoded simultaneous source super-gather. One may note that the image is noisy with poor signal-to-noise ratio (SNR). FIG. 3C shows a corresponding stack of 25 such SS-RTM images, each obtained with a different encoding (generally corresponding to step 204 of method 200). The image is an improvement over the FIG. 3B. However, even after 25 stacks visible noise in still observable. Next we apply steps 206 and 208 of method 200 using curvelet transform and wiener filtering. The resulting enhanced image (e.g., result of step 210 of the method 200) is shown in FIG. 3D. The quality of the image is very similar to the image in FIG. 3A; which is the desired result.

Figures 4A, 4B:
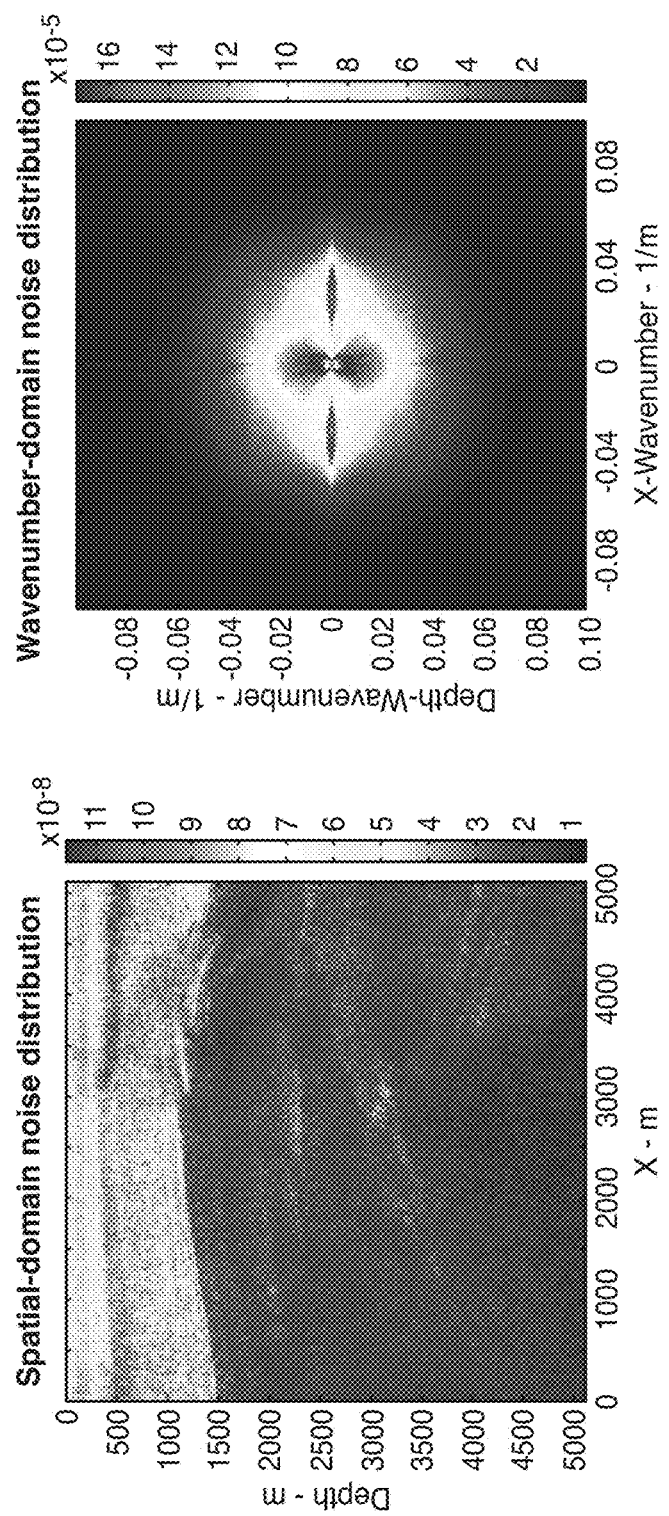
FIGS. 4A-4B illustrate the distribution in different domains of the noise corresponding to the exemplary simulated application of FIG. 3.

With reference now to FIG. 4A, a distribution of the noise spatially for the curvelet coefficients of the example of FIGS. 3A-3D is shown. From the figure, one may observe that the noise is greater in the shallow part than the deeper part. Recognizing such spatial distribution is beneficial in deciding the threshold used to carry out de-noising. FIG. 4B shows the noise distribution in spatial wavenumber domain. Examining the distribution in different domains may be beneficial in designing appropriate filters that protect the signal.

As previously mentioned, the present invention has been described in the context of SS-RTM. It should be understood, however, that the invention has broader applicability and may be used in connection with many other computation intensive operations, including iterative inversion techniques. For example, the present invention may also be applied to efficiently compute gradients during Full Waveform Inversion (i.e., FWI). In general, FWI estimates a model of subsurface parameters (such as wave propagation velocities) by iteratively minimizing the difference between observed data and data simulated with the subsurface parameter model. One step in FWI is computing the gradient of a cost function. This gradient computation step is nearly identical to RTM in terms of being computationally expensive. In at least one embodiment the present invention may be applied to speed up gradient computation as follows:

1. Generate the gradients of objective functions computed using different sets of known random reciprocal encoding functions (similar to step 204 of method 200).
2. Decompose each gradient image into its components by, for example, transforming each gradient into a different domain (similar to step 206 of method 200).
3. If the characteristics (such as phase and magnitude) of an image component are similar across all gradients, then the component contains predominantly signal energy and, therefore, is retained. In contrast, if the characteristics (such as phase and magnitude) of an image component vary across all or most gradients, then the component contains predominantly noise energy and, therefore, is attenuated (similar to step 208 of method 200).
4. Construct an enhanced gradient by combining all of the retained components (similar to step 210 of method 200).

Accordingly, one of ordinary skill in the art may appreciate, given the benefit of this disclosure, that the method 200 may be implemented with any of a number of computationally intensive processes substituted for SS-RTM.

In the simultaneous source method, individual shots are encoded with an encoding function and summed to form a simultaneous shot gather. In case of fixed-spread geometry, a receiver listens to all shots whereas for marine streamer a receiver listens to only a subset of shots. Unfortunately, in the process of forming these encoded shots, the offset information in the data is lost. This is because a single trace has contribution from many shots. Therefore the traditional techniques to form image gathers do not work for encoded simultaneous source data since the source-receiver pair information for the traces is lost. As a result, offset-based imaging algorithms such as Kirchhoff or Beam migration cannot be applied for simultaneous source data. Despite this drawback, it is possible to produce an image using simultaneous source data—since it requires only a forward and backward propagation with a complicated source function (i.e., the simultaneous encoded source). The propagation mechanism can be the 1-way or 2-way wave equation method. It is also important to note there is no complication if the simultaneous source data are generated from non-fixed receiver spread such as marine streamer data since there is no data fitting process in a migration algorithm, unlike FWI. Multiple realizations may be used to reduce cross-talk noise that occurs in forming these images, with the noise reduction either via simple stacking or using the de-noising technique disclosed previously, for example using the curvelet transform.

These principles can be used to develop a velocity model building embodiment of the present invention that can be described as follows:

(1) Form shot gathers from the data and bin the shot gathers into offset bins, i.e. shot gathers with a specified range of offsets. Possible offset bins can be near, mid and far but any possible combinations are permissible.
(2) Encode each offset bin to form simultaneous source data.
(3) Use M realizations of a particular offset-binned simultaneous source data to generate the image. This can be achieved by RTM or a 1-Way wave propagation method. Different realizations means using a different random set of encoding functions. Each realization is migrated and stacked, thereby improving the signal-to-noise ratio. Alternatively, the de-noising technique disclosed previously, for example using the curvelet transform, could be used on the multiple realizations.
(4) If the velocity model is accurate, one would expect that events in the individual images from different offsets will be registered at the same depth. Any mis-positioning of these images indicates inaccuracy in the velocity model. This mis-positioning information may be translated into a velocity update using any of several approaches, for example:
   (a) Determine the regions where the images are mis-positioned; these will be the regions where local velocity updates are needed to properly position the events in the offset binned migrated images. Different velocity panels with local modifications can be used to regenerate the images and examine the image registration.

(b) Another possibility is that images from mid and far offsets can be cross-correlated to a near-offset image to determine the shift. These shifts then can to be translated into velocity update.

(c) Treat the image mis-positioning as 3D image registration problem. In this case, offset gathers can be produced and the moveout can be used to update the velocity using reflection tomography.

The cost of this approach is N×M where N is the number of offset bins (typically ~3) and M is the number of realizations used for each offset bin simultaneous source imaging. In regions with large number of shots, this can be computationally efficient. The SS-RTM images can also be used to compute angle gathers using either non-zero lag cross correlations or using Poynting vectors. A key idea is that instead of migrating individual shots, one can use simultaneous source RTM to compute the angle gathers.

Figure 5:
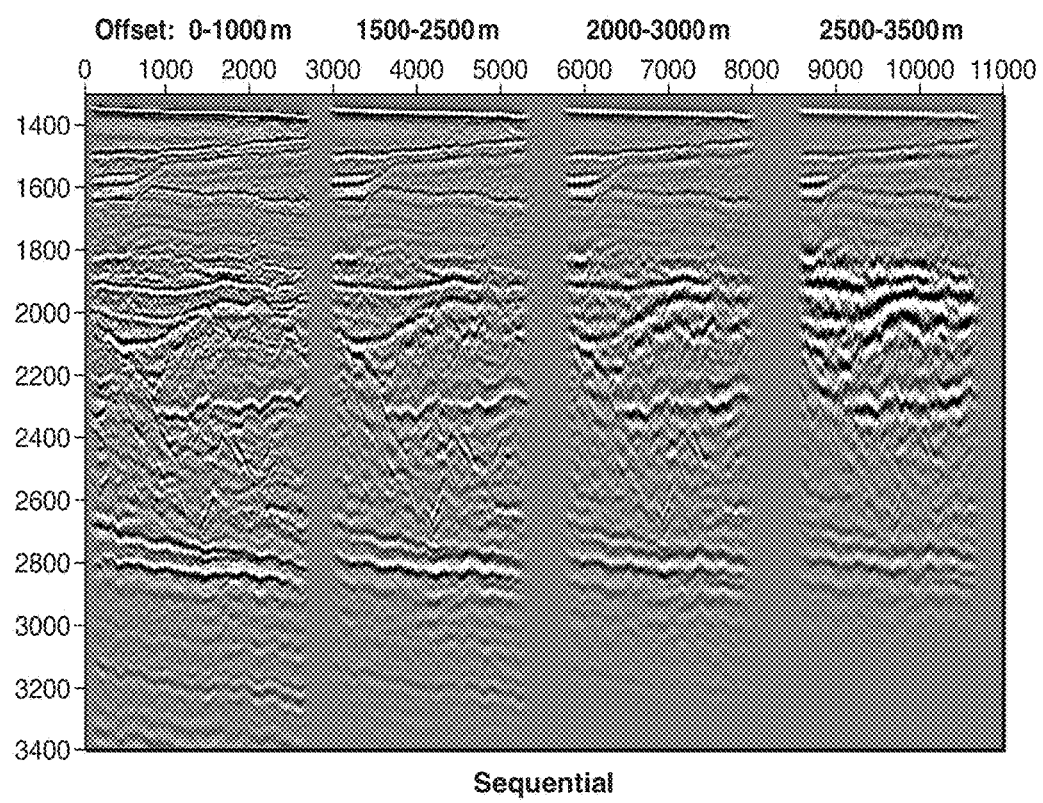
FIG. 5 shows sequential-shot RTM images of seismic data binned into different offset bins.

FIG. 5 shows the RTM images of synthetic data binned into different offset bins. The RTM was carried out with sequential shots, which is 20 times more expensive than the SS-RTM approach shown in FIG. 6. The first panel in FIGS. 5 and 6 is the RTM image for offsets from 0-1000 m; the second panel is the RTM image for offsets from 1500-2500 m; the third panel is the RTM image for offsets from 2000-3000 m; and the fourth panel is the RTM image for offsets from 2500-3500 m.

Figure 6:
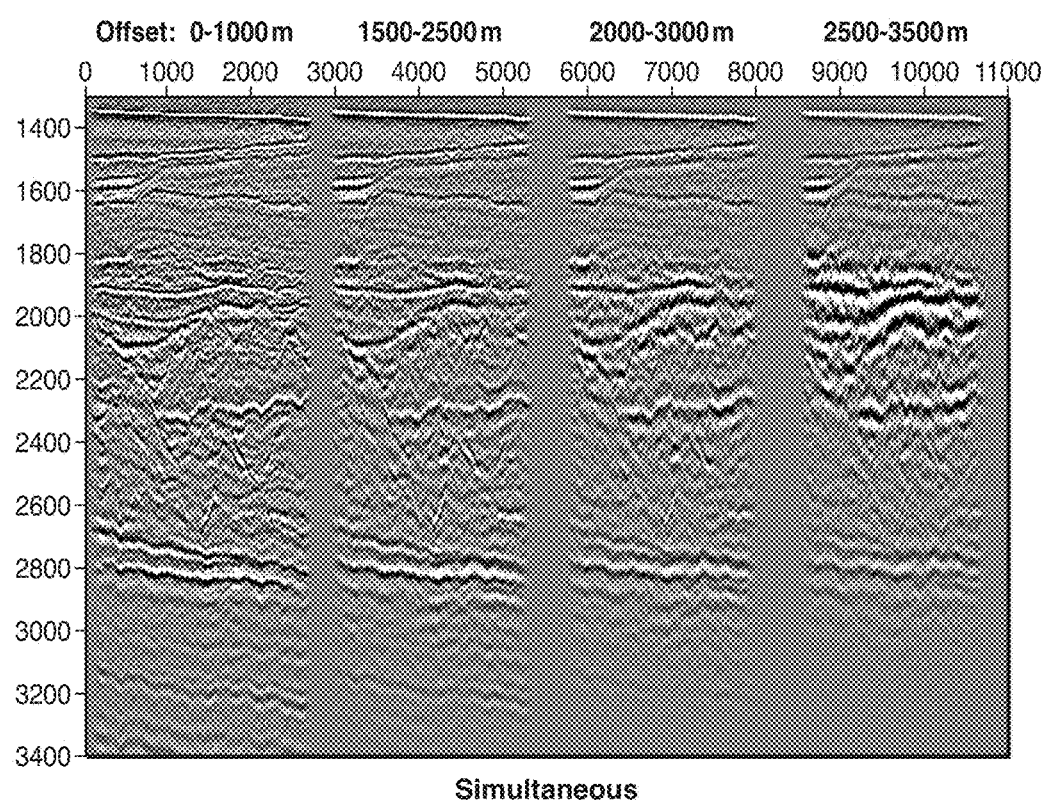
FIG. 6 shows SS-RTM of the same seismic data as in FIG. 5, binned into different offset bins.

FIG. 6 shows similar RTM images, but using SS-RTM. The close equivalence of FIGS. 5 and 6 illustrates that SS-RTM is able to produce very comparable images compared to sequential RTM at much reduced cost. The speed up generated by simultaneously migrating several sources simultaneously using source encoding was taught by Ober and Romero (U.S. Pat. No. 6,021,094 to Ober, et al.). However, the present inventive method adds a denoising strategy to further speed up the migration and also adds the idea of interrogating the velocity model using offset binned migrated images. One can notice from both FIG. 5 and FIG. 6 that with increasing depth, focusing of the images is lost as offsets increase, and careful examination shows that the some of the deeper events are mis-positioned indicating that velocity in some of the deeper regions can be incorrect.

Figure 7:
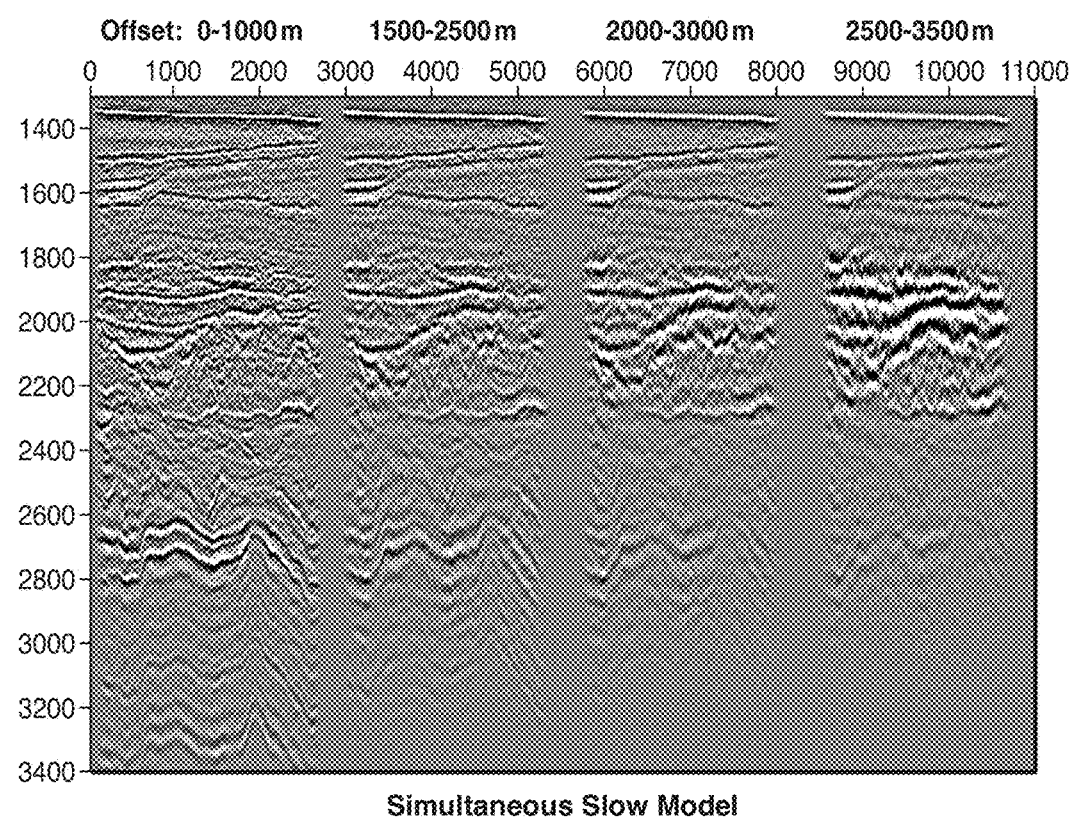
FIG. 7 shows SS-RTM images for the four offset bins with an incorrect (slow) velocity model.

FIG. 7 shows an extreme example where error is deliberately introduced in the velocity model. The RTM images for the various offset bins with the incorrect velocity model clearly indicate the mis-positioning as well as loss in signal strength (i.e. loss of focusing) with increasing offset.

In accordance with various embodiments of the present invention, the methods described herein are intended for operation as software programs running on a computer processor. Dedicated hardware implementations including, but not limited to, application specific integrated circuits, programmable logic arrays, microprocessor based devices, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

REFERENCES

Baysal, E., Kosloff, D. D., and Sherwood, J. W. C., 1983, Reverse time migration, Geophysics, 48, 11, 1514-1524.

Dai, W., and Schuster, J., 2009, Least-squares migration of simultaneous sources data with a deblurring filter, SEG expanded abstract, 2990-2994.

Godwin, J, and Sava, P., 2010, Simultaneous source imaging by amplitude encoding, CWP report 645.

C. C. Ober, L. A. Romero, and D. C. Ghiglia, Method of migrating seismic records, U.S. Pat. No. 6,021,094 (assignee: Sandia)

L. A. Romero, D. C. Ghiglia, C. C. Ober, and S. A. Morton, 2000, Phase encoding of shot records in prestack migration, Geophysics, vol. 65, 426-436.

F. Perrone and P. Sava, Comparison of shot encoding functions for reverse-time migration, 2009, SEG Expanded Abstract 2980-2984.

F. Perrone and P. Sava, 2010, Wave-equation migration with dithered plane waves, CWP report 646.

Claerbout, J. F., 1985, Imaging the earth's interior: Blackwell Scientific Publications.

Stolt, R. H., 1978, Migration by Fourier transform: Geophysics, 43, 23-48.

Tang, Y., and Biondi, B., 2009, Least-squares migration/inversion o blended data, SEG Expanded abstract, 1041-1044.

Verschuur, D. J., and Berkhout, A. J., 2009, Target oriented least-squares imaging of blended data, SEG expanded abstract, 2889-2893.

Whitmore, N. D., 1983, Iterative depth migration by backward time propagation, SEG Expanded Abstract, 382-385

Yilmaz, 1987, Seismic Data Processing, Society of Exploration Geophysicists.

What is claimed is:

1. A method for processing seismic data, the method comprising:
   a. obtaining a plurality of initial subsurface images, wherein each of the initial subsurface images is generated using a unique random set of encoding functions, and the initial subsurface images are obtained by simultaneous-source reverse-time migration;
   b. decomposing each of the initial subsurface images into components, wherein the decomposing is performed by a transform generating a set of transform coefficients for each initial subsurface image;
   c. identifying a set of components comprising one of (i) components having at least one substantially similar characteristic across the plurality of initial subsurface images, and (ii) components having substantially dissimilar characteristics across the plurality of initial subsurface images, wherein step c includes averaging the transform coefficients to generate a preliminary signal transform coefficient estimate and computing a variance of at least a subset of the transform coefficients to determine a noise level in the preliminary signal transform coefficient estimate; and
d. generating an enhanced simultaneous-source reverse-time migration subsurface image using the set of components identified in step c, wherein step d includes attenuating noise in the transform coefficients using the determined noise level and the preliminary signal transform coefficient estimate to generate attenuated transform coefficients, and performing an inverse transform on the attenuated transform coefficients to generate the enhanced simultaneous-source reverse-time migration subsurface image;
wherein steps a-d are performed using a computer.

2. The method of claim 1 further comprising the step of attenuating components not identified as having at least one substantially similar characteristic across the plurality of initial subsurface images.

3. The method of claim 1 wherein the transform is a curvelet transform.

4. The method of claim 1 wherein the transform is a Fourier transform, wavelet transform, F-K transform, or radon transform.

5. The method of claim 1 wherein the initial subsurface images are generated by:
 a. obtaining a set of shot gathers comprising forward and backward wave component data;
 b. selecting first and second random encoding functions;
 c. encoding the forward wave component data for each source in the set of shot gathers using the first random encoding function to form an Encoded Source Super-Shot Wave Component;
 d. encoding the backward wave component data for each receiver in the set of shot gathers using the second random encoding function to form an Encoded Receiver Super-Shot Wave Component;
 e. forward propagating the Encoded Source Super-Shot Wave Component to generate a Forward Propagated Wave Component;
 f. back propagating the Encoded Receiver Super-Shot Wave Component to generate a Back Propagated Wave Component;
 g. applying an imaging condition to the Forward and Back Propagated Wave Components to generate a subsurface image; and
 h. iteratively repeating steps b-g until a predetermined condition is satisfied, wherein the first and second random encoding functions are selected so that the functions are unique for each iteration.

6. The method of claim 5 wherein the encoding the forward and backward wave components is performed using scalars in the time domain.

7. The method of claim 5 wherein the encoding the forward and backward wave components is performed using scalars in the frequency domain.

8. The method of claim 5 wherein the first and second random encoding functions are reciprocal.

9. The method of claim 8 wherein the first and second reciprocal random encoding functions are unit-magnitude encoding functions.

10. The method of claim 9 wherein the first or second reciprocal random encoding function includes a unit-magnitude complex number encoding function.

11. The method of claim 5 wherein the first and second random encoding functions include reciprocal random encoding functions on plane waves with different angles of incidence.

12. The method of claim 5 wherein the first random encoding function is equivalent to the second random encoding function.

13. The method of claim 1, further comprising first iteratively inverting the seismic data, said inversion involving computing gradients of objective functions associated with the seismic data, and then performing the method with the gradients being regarded as the initial subsurface images.

14. The method of claim 1, wherein the encoding functions have unit magnitude.

15. A method for processing seismic data, the method comprising:
 a. forming shot gathers from the seismic data and binning the shot gathers into at least two bins, each offset bin having shot gathers with a specified range of offsets;
 b. obtaining a plurality of initial subsurface images, wherein each of the initial subsurface images is generated using a unique random set of encoding functions, wherein step b includes encoding the gathers in each offset bin using a unique random set of encoding functions to form composite gathers of simultaneous source data, then repeating at least once using a different random set of encoding functions, thereby forming at least two realizations of each offset-bin composite gather, said at least two realizations becoming, after migration using an assumed velocity model, the plurality of initial subsurface images for step c;
 c. decomposing each of the initial subsurface images into components,
 d. identifying a set of components comprising one of (i) components having at least one substantially similar characteristic across the plurality of initial subsurface images, and (ii) components having substantially dissimilar characteristics across the plurality of initial subsurface images; and
 e. generating an enhanced subsurface image using the set of components identified in step c;
wherein steps a-e are performed using a computer.

16. The method of claim 15, wherein the migration is SS-RTM, and further comprising examining coherency or consistency of the enhanced subsurface image for different offset bins to assess accuracy of the assumed velocity model.

17. The method of claim 16, further comprising using mis-positioning of one or more reflection events between different offset bins to estimate a corresponding update to the assumed velocity model.

* * * * *